Aug. 11, 1970     J. V. PENNINGTON     3,523,445
PRESS AND RAM TYPE ACTUATORS FOR MOVING THE PLATENS THEREOF
Filed April 30, 1968                        6 Sheets-Sheet 1

John V. Pennington
INVENTOR.

BY Browning, Hyer, Eickenroht & Thompson
ATTORNEYS

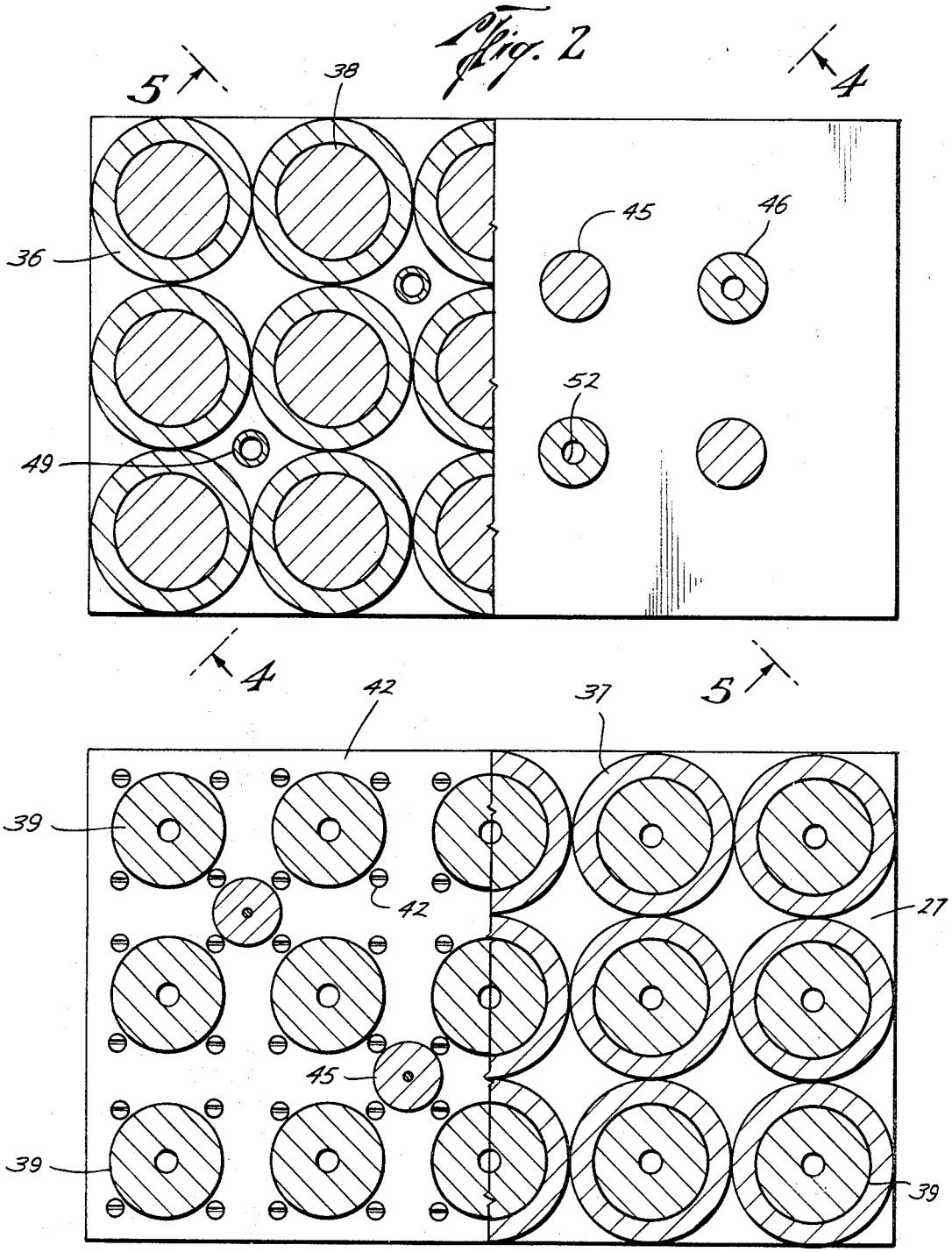

John V. Pennington
INVENTOR.

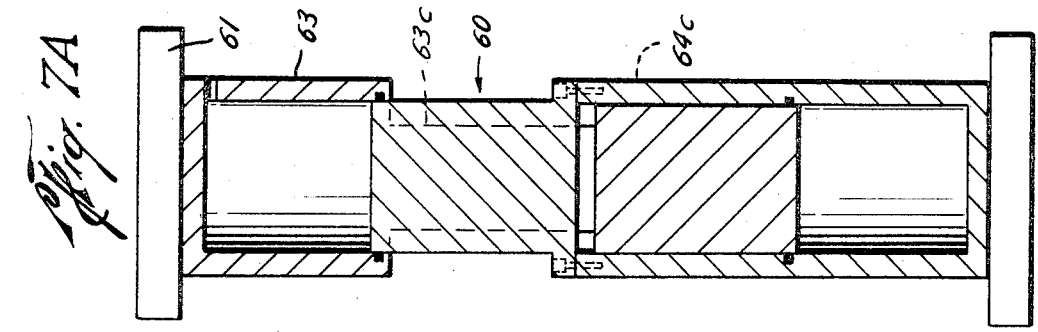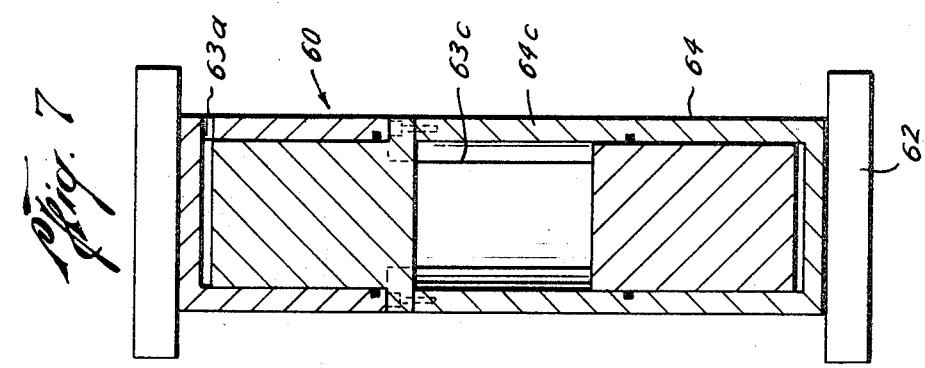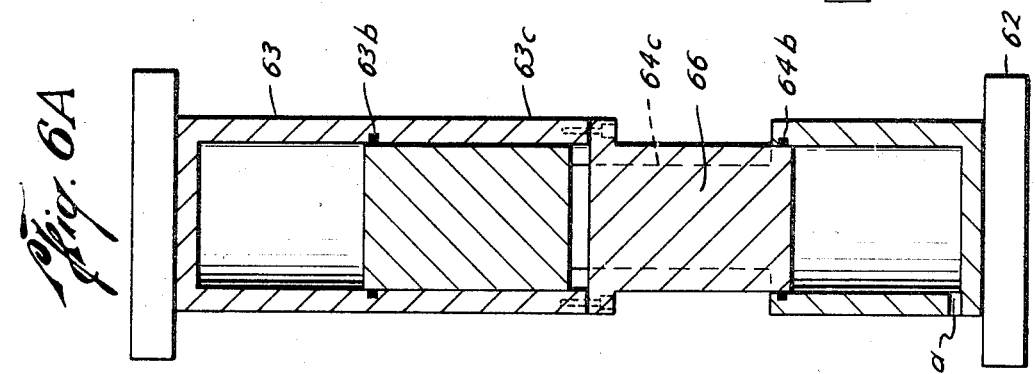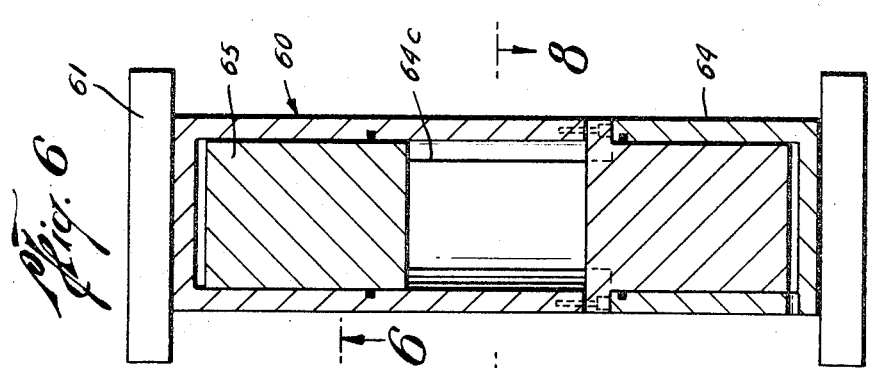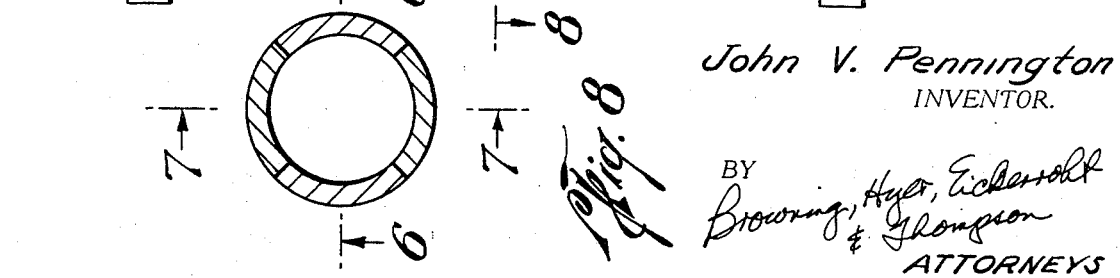

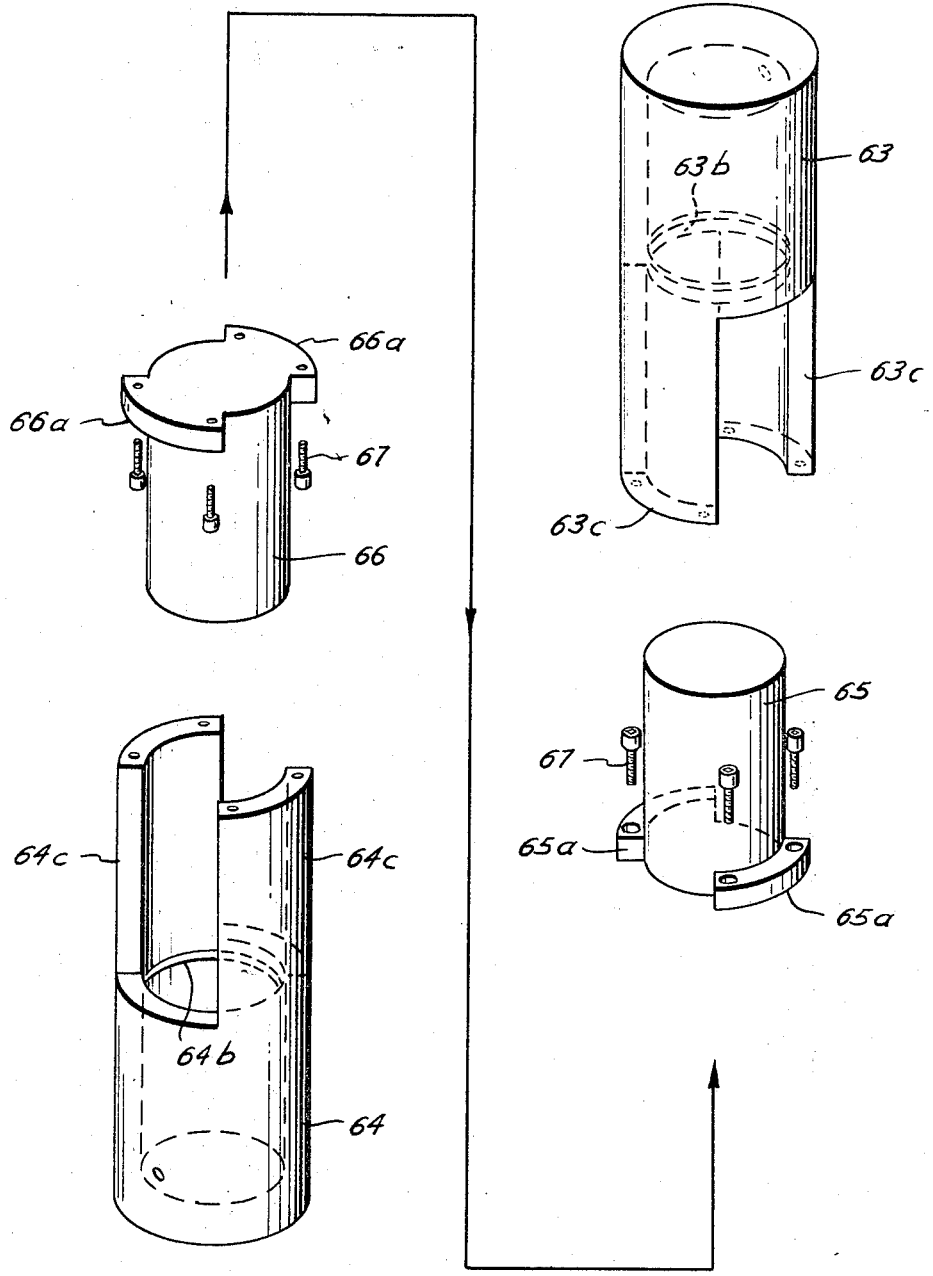

United States Patent Office 3,523,445
Patented Aug. 11, 1970

3,523,445
PRESS AND RAM TYPE ACTUATORS FOR MOVING THE PLATENS THEREOF
John V. Pennington, Houston, Tex., assignor to Cameron Iron Works, Inc., Houston, Tex.
Filed Apr. 30, 1968, Ser. No. 725,400
Int. Cl. B21j 9/12
U.S. Cl. 72—453                                                20 Claims

ABSTRACT OF THE DISCLOSURE

A press comprising a frame, a first platen fixed to the frame, and a second platen mounted on the frame for movement toward and away from the first platen. First and second sets of cylinders are arranged on different levels between the inner faces of the platens, with the cylinders of the first set extending from the inner face of the fixed platen, and the cylinders of the second set extending from the inner face of the movable platen. A ram is sealably slidable within each cylinder, and a means is provided for introducing pressure fluid into each cylinder so as to move the ram from a retracted to an extended position with respect to the cylinder. Each ram slidable in a cylinder of one set is connected to the cylinders of the other set so that the aligned cylinders and rams provide actuators for transmitting the forces developed in the first set of cylinders to the movable platen and transmitting the forces developed in the second set of cylinders to the fixed platen, and thereby moving the movable platen away from the fixed platen with the combined forces of both. In the illustrated press, these connections between the rams and cylinders include posts disposed outwardly of the paths of movement of the rams to permit the outer ends of the rams to move into positions substantially adjacent to one another upon movement from retracted to extended positions. An alternative embodiment discloses a single actuator disposable between other load bearing members, the ram slidable in each cylinder is connected directly to the other, axially aligned cylinder.

---

This invention relates to improvements in presses of the type having a plurality of fluid actuated rams for moving one of the platens thereof relative to another platen. It also relates to improved ram type actuators for this and other uses.

In conventional presses of this type, cylinders for the rams are arranged between the inner faces of fixed and movable platens, so that the die or other work-forming part of the movable platen can be pressed against the work supported on another platen. In the interest of maintaining the length and width of the platens as small as possible, and thus reducing to a minimum the size and cost of the press, each cylinder is normally disposed as close as possible to adjacent cylinders.

Thus, according to conventional practices, large capacity presses require more, or larger, ram cylinders and larger platens, even though the increased working area of the platens is not needed. This greatly increases the cost of the press since its frame must be made stronger to withstand the increased bending moments across the platens and the ends of the frames. Consequently, there is a need for a press having a ram arrangement which enables an increased power capacity without the need for the correspondingly larger platens, heretofore thought necessary.

Although a conventional tandem arrangement of the rams, in which a rod would transmit the force on one ram to another ram coaxial with it, would reduce the headroom requirements, it would also reduce the available pressure responsive area on such other ram. Thus, in order to obtain the increased power capacity, it would be necessary to provide larger platens.

An object of this invention is to provide a press in which the rams are so arranged that its power capacity per unit of platen area is essentially doubled over that of conventional ram arrangements, but in which its headroom requirements need not be substantially more than the height of two cylinders and the stroke of each ram.

A more particular object is to provide such a ram arrangement in which the loads to be transmitted between the platens are substantially evenly distributed between the various rams and cylinders.

Another object is to provide actuators having tandem rams for arrangement betwen press platens, as well as between other load bearing members, which do not require conventional piston rods which reduce the available pressure responsive areas of the rams.

Still a further object is to provide such a ram type actuator which may be used singly as well as in a grouping.

These and other objects are accomplised, in accordance with the illustrated embodiments of the invention, by a press comprising a frame having upright sides and upper and lower ends which form a loop. Fixed platens are mounted within the loop at the upper and lower ends of the frame, and an intermediate platen is mounted within the loop for vertical movement with respect to the frame and the fixed platens. More particularly, ram type actuators are arranged between inner faces of one fixed platen and the movable platen so as to move the latter toward work supported on the other fixed platen.

In the illustrated embodiment of the invention, this ram arrangement includes a first set of cylinders extending from the inner face of a first platen and a second set of cylinders extending from the inner face of a second platen, with each of the cylinders of the first set being substantially axially aligned with a cylinder of the second set. A ram is sealably slidable within each cylinder, and a means is provided for introducing pressure fluid into each cylinder so as to move the ram therein between a retracted to an extended position with respect to the cylinder.

When the rams are in retracted position, the outer ends of those slidable in the second set of cylinders are spaced from the outer ends of those slidable in the first set of cylinders, and preferably a distance not substantially greater than the stroke of a ram from retracted to extended positions. A means is provided for transmitting the force developed in each cylinder of the first set to the second platen, and the force developed in each cylinder of the second set to the first platen. Thus, each pair of axially aligned cylinders and rams form actuators for moving the platens apart with the combined forces of both. More particularly, this force transmitting means is disposed outwardly of the paths of movement of the rams and connects each ram slidable in a cylinder of one set with the axially aligned cylinder of the other set. Thus, the outer ends of the rams can be moved toward one another, and preferably into position substantially adjacent one another upon movement from retracted to extended positions. Preferably, the cylinders of each set for disposed substantially tangent to adjacent cylinders in the same row to provide a compact arrangement.

With this preferred arrangement, the total force exerted between the platens is essentially twice that which would be exerted by a conventional ram arrangement having the same sized cylinders, and occupying the same platen area, since the pressure fluid within the cylinders is able to develop across the entire area of each ram.

In the large capacity press illustrated in the drawings, when the cylinders of each set are arranged in substantially parallel, laterally and longitudinally extending rows the force thus exerted between the patents is substantially evenly distributed to the various rams and cylinders by means of load plates which connect to and form the outer ends of each set of cylinders and additional load plates which connect to and form the outer ends of the rams slidable within each such set. Posts connect each of the first mentioned load plates with one of the additional load plates so that the force exerted on each ram of the cylinders of one set is transmitted through the load plate connected thereto, the posts connecting such load plate to the load plate connected to the cylinders of the other set, and then through the last-mentioned load plate to such other set of cylinders.

In an alterative embodiment of the actuator, the ram reciprocal in each cylinder is connected directly to the other, axially aligned cylinder. Thus, this type of actuator may be used singly and independently of others, rather than in an arrangement such as that above described.

In the drawings, wherein like reference characters are designated by like parts:

FIG. 2 is a horizontal sectional view of the press of FIG. 1, taken partially through the upper set of cylinders and partially through a mid-portion of the press intermediate the upper and lower sets of cylinders, as seen along line 2—2 of FIG. 4;

FIG. 3 is another horizontal sectional view of the press, taken through different levels of the lower set of cylinders, and as seen along broken line 3—3 of FIG. 4;

FIGS. 6 and 6A are longitudinal sectional views of a single actuator in closed and open positions, respectively, and as seen along broken line 6—6 of FIG. 8;

FIGS. 7 and 7A are longitudinal sectional views of the single actuator also in opened and closed positions, respectively, and as seen along broken line 7—7 of FIG. 8.

FIG. 8 is a cross-sectional veiw of the single actuator, as seen along broken line 8—8 of FIG. 6; and FIG. 9 is an exploded, perspective view of the single ram.

Figure 1:
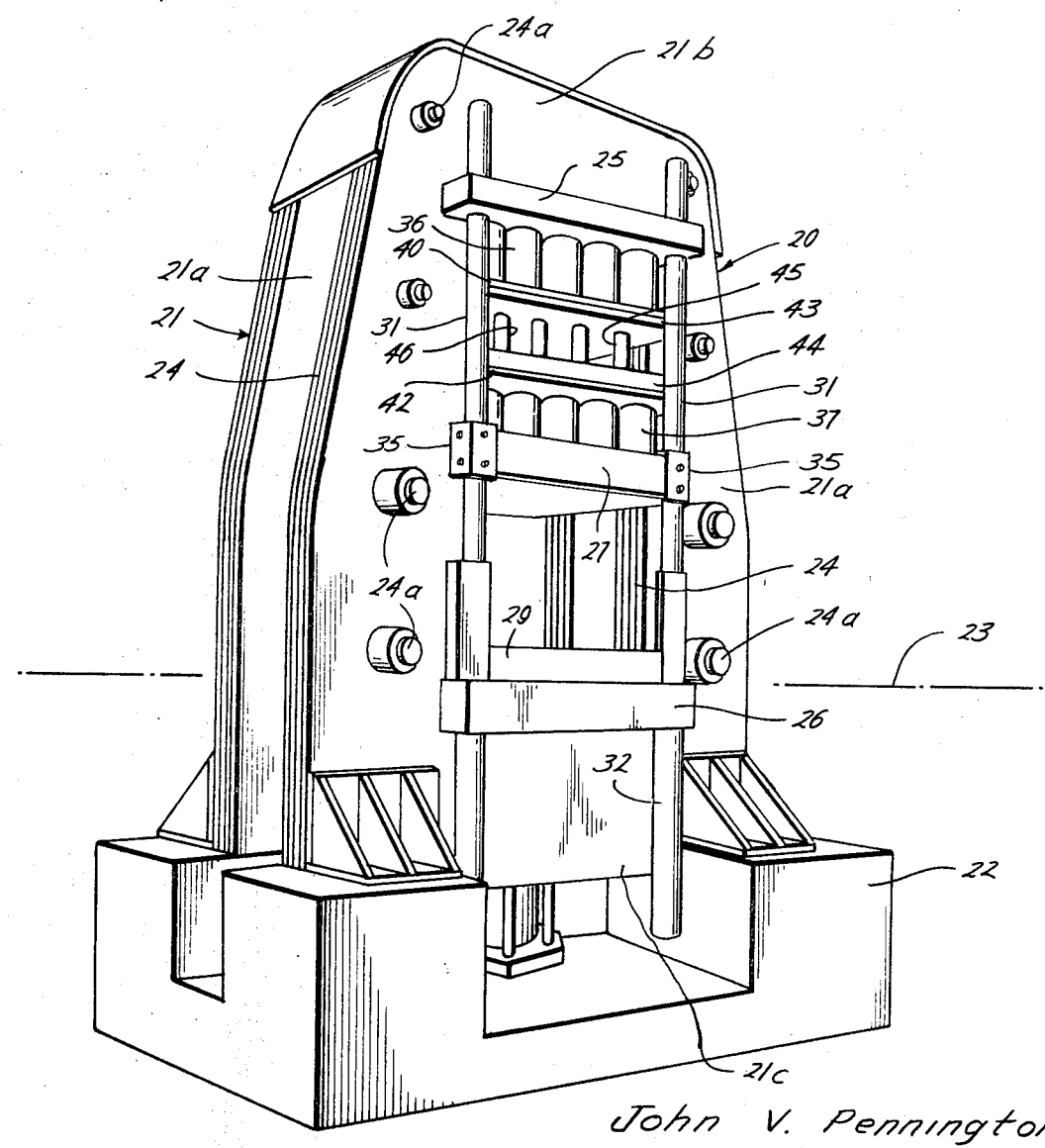
FIG. 1 is a perspective view of a press having fixed platens at its upper and lower ends, a movable platen intermediate the fixed platens, and rams arranged between the upper fixed platen and the movable palten in accordance with one illustrated embodiment of the present invention.

With reference now to the details of the above-described drawings, and particularly FIG. 1, the hydraulic press, which is indicated in its entirety by reference character 20, includes a frame 21 having uprights 21a connected at the upper and lower ends 21b and 21c, respectively, of the frame so as to form a loop. The uprights as well as the lower ends of the frame are supported on a massive concrete footing 22 disposed beneath floor level 23. The uprights 21a are made up of spaced-apart plates 24 which are interconnected by bolts 24a and held in fixed spaced relation by spacers (not shown) about the bolts.

An upper fixed platen 25 is supported by the frame beneath its upper end 21b, and a lower fixed platen 26 is supported by the lower end 21c of the frame near the floor level 23. An intermediate movable platen 27 is disposed between the fixed platens 25 and 26 for movement vertically therebetween. All of the platens are, of course, disposed within the loop between the uprights of the frame. The movable platen 27 is forced downwardly toward the lower fixed platen 26 by means of the above described arrangement of ram type actuators disposed between the opposite faces of the movable platen and the upper fixed platen. Thus, the lower face of the movable platen 27 is moved toward the upper face of the lower fixed platen 26 to press a work piece supported above the platen 26. This work piece may be a forging contained in a die and moved onto the upper-surface of the platen 26 by means of a slide 29. A die may be supported from the lower face of the movable platen 27 for cooperation with the lower die in producing the desired forging.

The movable platen 27 is guided in its vertical movement within the loop by connection to a pair of vertically reciprocable guide columns 31 on each of the front and back sides of the frame uprights. More particularly, each of the guide columns 31 has a lower end received within a guide cylinder 32 mounted on the frame adjacent the uprights 21. The lower end of each such cylinder is closed to form a pressure chamber (not shown) beneath the lower end of a guide column 31. Thus, with the guide columns sealably slidable within the cylinders, pressure fluid may be admitted to the chambers so as to raise the columns and thus the platen 27 or exhausted therefrom to permit the guide columns to be forced downwardly, in a manner to be described.

The upper portions of the guide columns 31 are guidably slidable within outwardly extending portions of the platens 25 and 26 on each of the front and rear sides of the frame. The corners of the movable platen 27 are provided with connectors 35 which fixedly connect to the guide columns 31.

As previously described, and shown in the drawings, the ram type actuators arranged between the platens 25 and 27 comprise a first set of cylinders 36 on an upper level and extending downwardly from the inner face of platen 25, and a second set of cylinders 37 on a lower level and extending upwardly from the inner face of platen 27. A ram 38 is sealably slidable within each of the cylinders 36 of the upper set, and a ram 39 is sealably slidable within each cylinder 37 of the lower set. The axis of each of the cylinders is perpendicular to the platen face from which it extends, and the inner faces of the platens are parallel to one another, so that the axes of all the cylinders 36, 37 are parallel to one another.

As best shown in FIGS. 2 to 5, the cylinders 36 of the first set and cylinders 37 of the second set are arranged in substantially parallel, longitudinally and laterally extending rows. More particularly, each set comprises three longitudinally extending rows and five laterally extending rows of cylinders. With the rams and cylinders being of equal size, as shown, such longitudinally and laterally extending rows are perpendicular to one another.

In accordance with the novel aspects of the present invention, each ram slidable within a cylinder of one set is axially aligned with a ram slidable within a cylinder of the other set. Thus, as can be seen from FIGS. 4 and 5, the rams 38 and 39 are arranged coaxially of one another, so that the longitudinally extending and laterally extending rows of both sets of cylinders lie in the same vertical planes. As will be described in more detail hereinafter, a means is provided for introducing pressure fluid into each of the cylinders for urging the rams slidable therein from a retracted or closed position, as shown in FIG. 4, to an extended or open position, as shown in FIG. 5.

Figure 4:
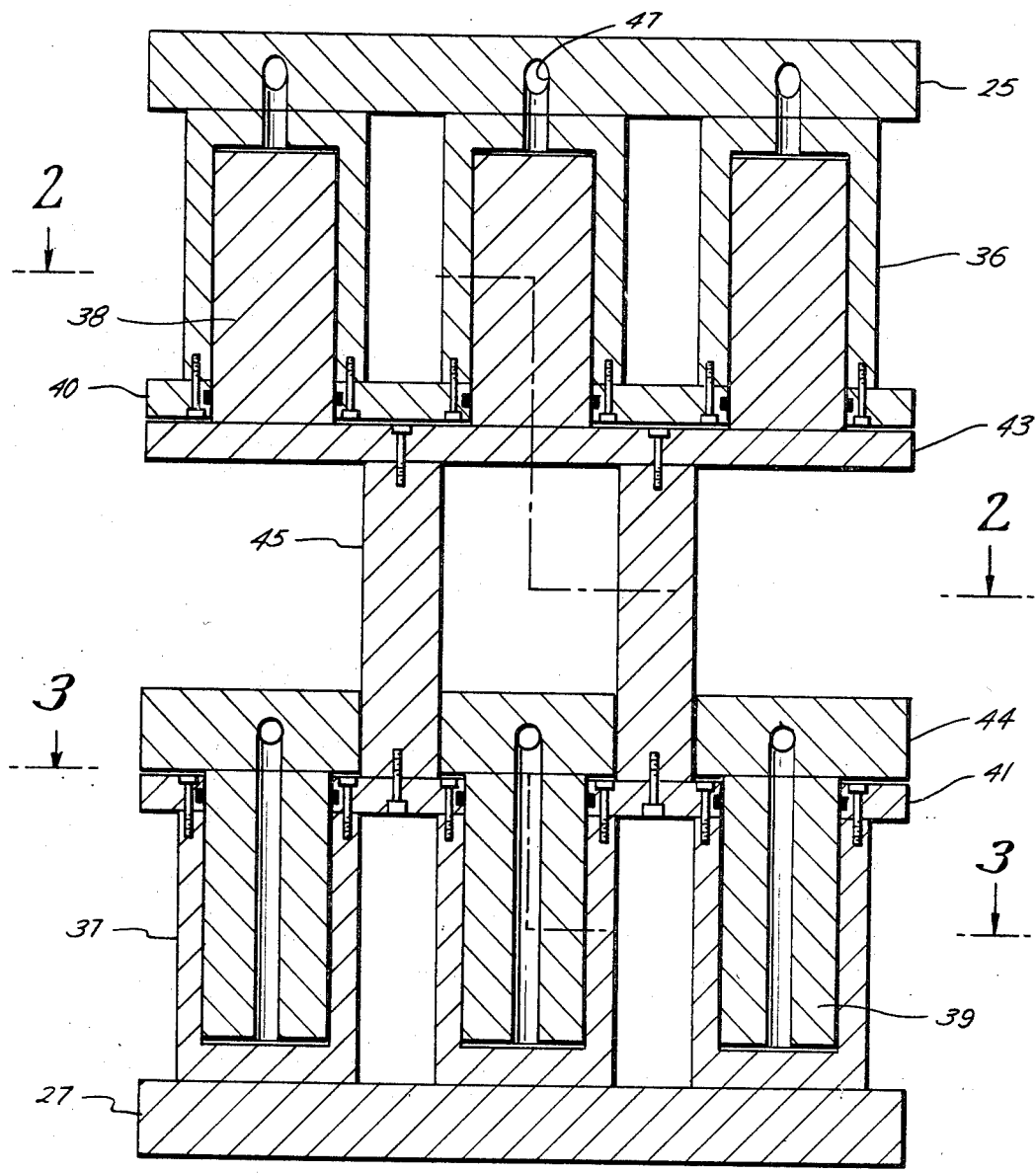
FIG. 4 is a vertical sectional view of the ram arrangement, as seen along broken line 4—4 of FIG. 2, and with the rams closed and the movable platen raised relative to the upper fixed platen.

When the rams are retracted, as shown in FIG. 4, the outer ends of those slidable in one set of cylinders are spaced from the outer ends of those slidable in the other set of cylinders a distance not substantially greater than the stroke of a ram in moving from retracted to extended position. Thus, when the rams are moved to extended positions, as shown in FIG. 5, their outer ends move into positions substantially adjacent one another.

Figure 5:
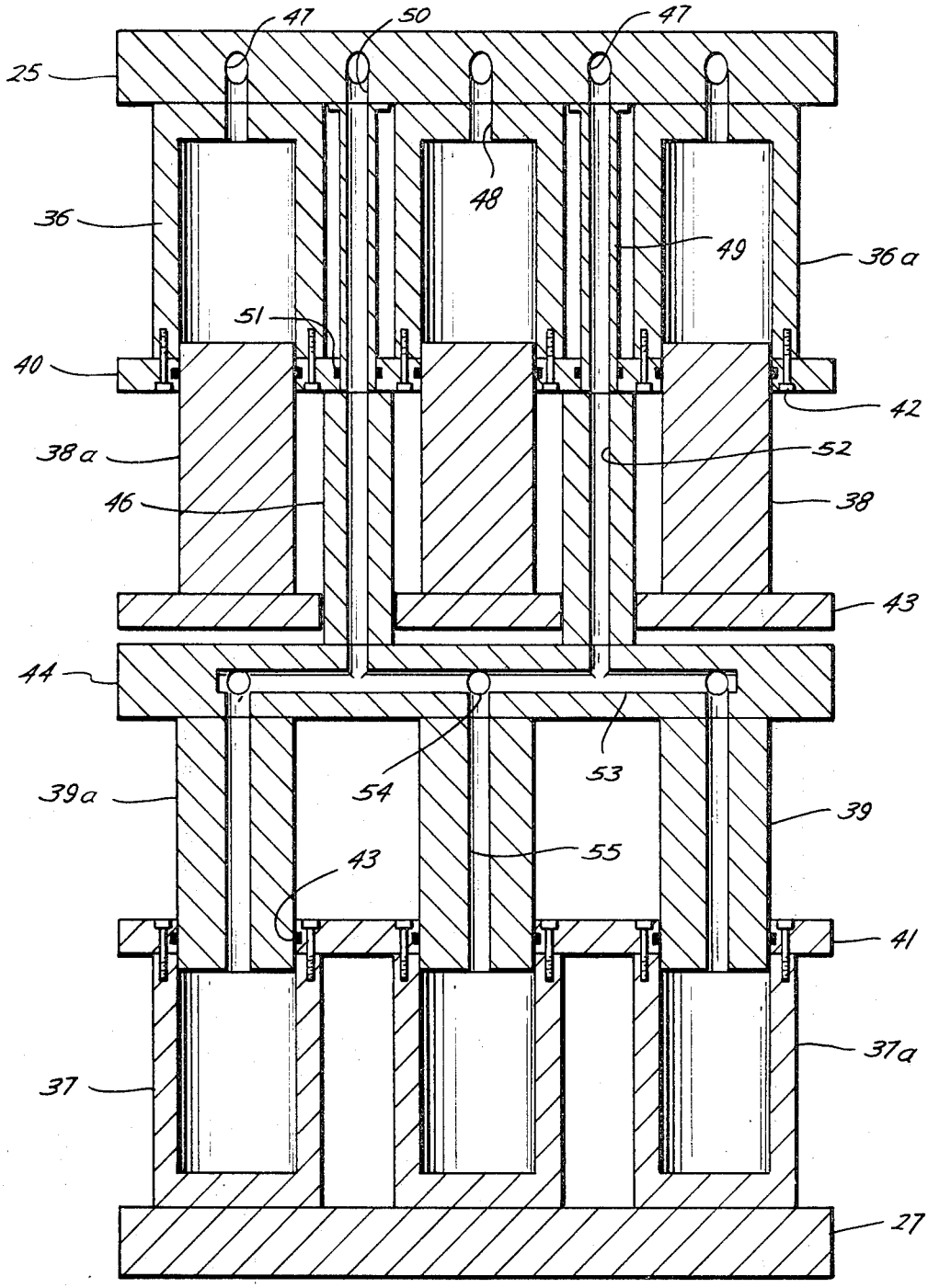
FIG. 5 is a vertical sectional view similar to FIG. 4, as seen along broken line 5—5 of FIG. 2, but with the rams opened so as to lower the movable platen relative to the upper fixed platen.

As previously described, the forces in the cylinders of one set are transmitted to the platen from which the cylinders of the other set extend so as to provide actuators which, upon extension of the rams from the FIG. 4 to the FIG. 5 position, move platen 27 downwardly and away from platen 25 toward the work. More particularly, and again in accordance with the novel aspects of this invention, the force transmitting means is disposed outwardly of the paths of movement of the rams so that the rams are free to move into the above described positions in which their outer ends are substantially adjacent one another.

In the preferred embodiment of the invention illustrated in the drawings, the rams slidable in one set of cylinders are connected directly to the cylinders of the other set by means of load plates connected to the outer ends of the rams and cylinders, whereby, as previously described, the forces exerted between the platens is distributed substantially evenly to the various rams and cylinders. Inasmuch as the forces developed in the cylinders of the set extending from one platen are thereby transmitted through the cylinders of the set extending from the other platen, and vice versa, each cylinder may be disposed substantially tangent to adjacent cylinders in the same set, as shown in FIGS. 2 and 3.

Thus, as best seen in FIG. 5, a first load plate 40 is connected to the outer ends of bodies 36a of the cylinders 36 of the first set and has openings therein aligned with the bores through the bodies 36a so as to form the outer ends of such cylinders. Similarly, a second load plate 41 is connected to the outer ends of bodies 37a of the second set of cylinders 37 and has openings therein aligned with the bores of the bodies 37a so as to form the outer ends of the cylinders 37. Each such load plate is removable secured to the cylinder bodies by means of bolts 42 and carries a seal ring 43 within each opening therethrough to form a seal with respect to the rams slidable in the cylinders.

A third load plate 43 is connected to the outer ends of bodies 38a of the rams 38 to form a continuation of the outer end of each such ram. Similarly, a fourth load plate 44 is connected to the outer ends of ram bodies 39a of the rams 39 so as to form the outer end of each such ram. Thus, when the rams 38 and 39 are extended, the opposite faces of the load plate 43 and 44, and thus the outer ends of the rams 38 and 39, are disposed substantially adjacent to one another, as previously described.

As shown in FIG. 4, posts 45 extend between and are connected at their opposite ends to the second and third load plates 41 and 43, respectively; and, as shown in FIG. 5, posts 46 extend between and are connected at their opposite ends to the first and fourth load plates 40 and 44, respectively. The posts 45 extend through openings in the load plate 44 so as to permit them to move downwardly through such openings as the rams 38 are extended or moved from the retracted position of FIG. 4 to the extended position of FIG. 5. Similarly, and as shown in FIG. 5, the posts 46 extend through holes in the load plate 43 so as to permit such openings to move downwardly over these posts during movement of the rams 38 from retracted to extended positions.

As shown in the drawings, these posts 45 and 46 are disposed outwardly of the paths of movement of the rams 38 and 39, so that, as previously mentioned, there is no interference therebetween during extension and retraction of the rams. More particularly, these posts are arranged substantially symmetrically with respect to the longitudinally and laterally extending rows of cylinders. That is, as is apparent from the sections 4—4 and 5—5 taken along diagonal planes through the ram assembly, the center lines of the posts are disposed in the same planes as the axes of diagonal rows of cylinders.

It will be understood, however, that the means for connecting the load plates, or for that matter, connecting the rams to the cylinders without the intermediate load plates, need not take the form of cylindrical posts. In fact, in the interest of providing as large a cross-sectional post area as possible, they might instead have opposite sides curved closely about adjacent rams to thereby consume substantially all of the available space outwardly of the paths of movement of the rams.

With the movable platen 27 raised to the position in FIG. 4, and upon the introduction of pressure fluid into the cylinders 36 and 37, the forces in cylinders 36 are transmitted through the load plate 43, and posts 45, and the load plate 41 to the cylinders 37. At the same time, the forces in the cylinders 37 are transmitted through the load plate 44, the posts 46, and the load plate 40 to the cylinders 36. With pressure fluid in the cylinders beneath columns 31 relieved, this will, of course, result in extension of the rams and lowering of the platen 27 to working position. Then, pressure fluid may be relieved in the cylinders 36 and 37 and introduced into the cylinders beneath the columns so as to retract the rams and raise platen 27.

Preferably, the means for supplying pressure fluid to each of the cylinders 36, 37 comprises manifolding disposed within only the upper fixed platen 25 and one load plate 44, which, of course, simplifies fabrication and operation of the press. Thus, as shown in FIGS. 4 and 5, flow passages 47 extend longitudinally through the upper fixed platen 25 for connection with one another by means of laterally extending passages (not shown). Pressure fluid may be supplied to these passages from any suitable source (not shown).

The outermost and middle passages 47 connect with the cylinders 36 of the first set by means of vertically extending passages 48 through the platen and the upper ends of such cylinders. The remaining passages 47, on the other hand, connect with the lower ends of cylinders 37 of the second set by means of the manifolding within load plate 44. For this latter purpose, conduits 49 connect at their upper ends with vertical passages 50 depending from the intermediate longitudinal passages 47. The lower ends of the conduits 49 extend through seal rings 51 carried within openings through load plate 40, so as to connect with the upper end of passage 52 extending through a post 46.

The lower ends of the passages 52 extending through the posts 46 are connected to diagonally extending passages 53 in the load plate 44, which are in turn connected with one another through passages 54 in such load plate. Passages 55 extend vertically downwardly through the pistons 39 for connection at their lower ends to the cylinders 37.

It will be noted, in this regard, that these various passages connecting passages 47 with the cylinders 37 are arranged within parts which are stationary during sliding of the rams with respect to their respective cylinders. Thus, as will be apparent from a comparison of FIGS. 4 and 5, it is the rams 38, the load plates 41 and 43, and the solid posts 45 which move during lowering of the movable platen 27. During this time, however, the rams 39, load plates 40 and 44, and the posts 46 are stationary with respect to the fixed platen 25.

The single actuator, which is shown in FIGS. 6 to 9 and indicated in its entirety by reference character 60, is disposed between upper and lower load carrying members 61 and 62, which, similarly to the platens of the press of FIGS. 1 to 5, are movable relatively toward and away from one another. More particularly, the actuator 60 includes an upper cylinder 63 extending downwardly from the lower face of member 61, and an axially aligned cylinder 64 extending upwardly from the upper face of member 62. A piston 65 is reciprocal within the cylinder 63, and a piston 66 is reciprocal within the cylinder 64. As in the actuators arranged between the platens of the press of FIGS. 1 to 5, the inner diameters of the cylinders 63 and 64, and thus the outer diameters of the pistons 65 and 66, are equal.

There is a port 63a leading to the upper end of cylinder 63 and a port 64a leading to the lower end of cylinder 64. Upon the introduction of pressure fluid through each of these ports into their respective cylinders, the rams are moved from the retracted positions of FIGS. 6 and 7 to the extended positions of FIGS. 6A and 7A. During such movement, the ram 65 is sealably slidable within a seal ring 63b carried on the inner diameter of cylinder 63 and the ram 66 is sealably slidable within a seal ring 64b carried about the inner diameter of the cylinder 64.

As will be described to follow, the ram 65 is connected directly to the cylinder 64, while the ram 66 is connected directly to the cylinder 63. When the rams are retracted, their outer, oppositely facing ends are spaced apart a distance not substantially greater than the stroke of each ram from retracted to extended position, so that when the rams are so extended, their outer ends are relatively close to one another. As a consequence, the headroom for the actuator 60, and thus the spacing between the load bearing members 61 and 62, need not be substantially greater than the height of the two rams plus their strokes.

The connection between the rams and cylinders of the actuator 60 comprise arcuate legs extending from and forming continuations of the cylinders for connection with arcuate flanges on the rams. More particularly, these connecting parts are staggered about the circumference of the cylinders and rams so that they are movable past one another upon extension and retraction of the rams. In this manner, the maximum outer diameter of the actuator need be no greater than the outer diameter of the cylinders, thereby occupying a minimum of area on the faces of the load bearing members 61 and 62.

As best shown in FIG. 9, arcuate legs 63c extend down from diametrically opposed portions of the lower end of cylinder 63 for connection to arcuate flanges 66a on diametrically opposed portions of the upper end of ram 66. In like fashion, arcuate legs 64c extend upwardly from diametrically opposed portions of the upper ends of cylinder 64 for connection to arcuate flanges 65a on diametrically opposed portions of the lower end of ram 65. As shown in FIG. 7, each arcuate leg 63c and 64c extends about substantially 90°, so that the connections between the rams and the cylinders have a maximum of cross-sectional area.

Bolts 67 for connecting the legs 63c to the flanges 65a and the legs 64c to the flanges 66a have heads fittable within counterbored portions of the flanges. Thus, as shown in FIGS. 6 and 7, the flanges 65 abut with the upper end of cylinder 64 and the flanges 66a abut with the lower end of cylinder 63, when the actuator is retracted into the position of FIGS. 6 and 7.

As will be appreciated from the foregoing, the actuator 60 is self-contained for use either singly or in combination with others actuators. Furthermore, it may be moved into and out of position between the members 61 and 62. Upon such removal, or alternatively upon movement of one of the members 61 and 62 from its normal position opposing the other, the actuator may be assembled and disassembled.

In the assembly process, one of the cylinders, such as the cylinder 64, is moved into an upright position, and the ram 66 slidable therein is lowered into position within it. For this purpose, the ram 66 is first inverted and rotated to align its flanges 66a with the slots between legs 64c, as shown in FIG. 9. The same process is repeated in connection with the cylinder 63 and ram 65. That is, the cylinder 63 is mounted in an upright position, and the ram 65 is rotated and inverted into a position to permit its flanges 65a to be moved downwardly between the legs 63c as the ram slides downwardly within the cylinder 63. The second ram and cylinder are then inverted, end for end, and rotated to dispose the legs 63c for movement between the legs 64c, after which the bolts 67 may be secured so as to connect the flanges 66a to the legs 63c and the flanges 65a to the legs 64c.

The rams may be returned to their retracted positions by any well known means, such as a spring or hydraulic means operating between rams 65 and 66. Additional space may be provided for such means by recessing adjacent faces of the rams.

From the foregoing it will be seen that this invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A press comprising a frame, a first platen fixed to the frame, a second platen mounted on the frame for movement toward and away from the first platen, a first set of cylinders extending from the inner face of the first platen, a second set of cylinders extending from the inner face of the second platen, each of the cylinders of the first set being substantially axially aligned with a cylinder of the second set, a ram sealably slidable within each cylinder, means for introducing pressure fluid into each cylinder so as to move the ram therein from retracted to extended position with respect to said cylinder, and means for transmitting the force developed in each cylinder of the first set to the second platen and the force developed in each cylinder of the second set to the first platen, said force transmitting means being disposed outwardly of the paths of movement of the rams in each pair of substantially axially aligned cylinders, and the outer ends of the retracted rams of the first set of cylinders being spaced from the outer ends of the retracted rams of the second set of cylinders to permit them to move toward one another, as they are extended, to move the platens apart with the combined forces of both sets of cylinders.

2. A press of the character defined in claim 1, wherein the outer ends of the retracted rams of the first set of cylinders are spaced from the outer ends of the retracted rams of the second set of cylinders a distance not substantially greater than the stroke of the rams from retracted to extended positions.

3. A press of the character defined in claim 1, wherein said force transmitting means includes means connecting each ram slidable in the cylinders of the first set with the cylinders of the second set and each ram slidable in the cylinders of the second set with the cylinders of the first set.

4. A press of the character defined in claim 3, wherein the cylinders of each set are arranged in substantially parallel, laterally and longitudinally extending rows, with each cylinder in each set being substantially tangent to adjacent cylinders in each row.

5. For use in a press, apparatus comprising a pair of oppositely facing platens relatively movable toward and away from one another, a first set of cylinder bodies extending from the inner face of the first platen, a second set of cylinder bodies extending from the inner face of the second platen, each cylinder body of the first set being substantially axially aligned with a cylinder body of the second set, a first load plate connected to the open outer ends of the first set of cylinder bodies and having openings therein aligned with said bodies to form a first set of cylinders, a second load plate connected to the open outer ends of the second set of cylinder bodies and having openings therein aligned with said bodies to form a second set of cylinders, a ram body sealably slidable within each cylinder, means for introducing pressure fluid into each cylinder so as to move the ram body therein between a retracted to an extended position with respect to said cylinder, a third load plate connected to the outer ends of the ram bodies in the cylinders of the first set, a fourth load plate connected to the outer ends of the ram bodies in the cylinders of the second set, and posts connecting the first load plate with the fourth load plate and the second load plate with the third load plate, said posts being disposed outwardly of the paths of movement of the ram bodies slidable with the two sets of cylinders, and said third and fourth load plates being spaced from one another, when said ram bodies are retracted, to permit them to move toward one another, upon extension, to move the platens apart with the combined forces of both sets of cylinders.

6. Apparatus of the character defined in claim 5, wherein said third and fourth load plates being spaced apart, when the ram bodies are retracted, a distance not substantially greater than the stroke of the ram bodies from retracted to extended position.

7. Apparatus of the character defined in claim 5, wherein the cylinders of each set are arranged in substantially parallel, laterally and longitudinally extending rows, with each cylinder in each set being substantially tangent to adjacent cylinders in each row.

8. Apparatus of the character defined in claim 7, wherein all rams are of the same diameter.

9. For use in a press, apparatus comprising a pair of oppositely facing platens relatively movable toward and away from one another, first and second sets of cylinders disposed between the inner faces of the platens with the first set of cylinders extending from the face of one platen and the second set of cylinders extending from the face of the other platen, each cylinder of each set being substantially axially aligned with a cylinder of the other set, a ram sealably reciprocable in each cylinder, means for introducing pressure fluid into each cylinder so as to move the ram therein between a retracted to an extended position with respect to said cylinder, means for transmitting the force developed in each cylinder of the first set to the other platen and the force developed in each cylinder of the second set to the one platen, said force transmitting means being disposed outwardly of the paths of movement of the rams and the outer ends of the rams of the cylinders of each pair of substantially axially aligned cylinders being spaced from one another, when said rams are retracted, to permit said outer ends to move toward one another, upon extension, to move the platens apart with the combined forces of both sets of cylinders.

10. Apparatus of the charactered defined in claim 9, wherein said outer ends of the rams are spaced apart, when retracted a distance not substantially greater than the stroke of said rams from retracted to extended position.

11. Apparatus of the character defined in claim 9, wherein said force transmitting means includes means connecting the ram of each cylinder of each set with the cylinder of the other set with which it is substantially axially aligned.

12. Apparatus of the character defined in claim 11, wherein adjacent cylinders in each set are substantially tangent to one another.

13. Apparatus of the character defined in claim 9, wherein said forces transmitting means includes means connecting each ram slidable in the cylinders of the first set with the cylinders of the second set and each ram slidable in the cylinders of the second set with the cylinders of the first set.

14. Apparatus of the character defined in claim 13, wherein adjacent cylinders in each set are substantially tangent to one another.

15. For use in a press, apparatus comprising first and second oppositely facing platens relatively movable toward and away from one another, a first cylinder extending perpendicularly from the inner face of the first platen and a second cylinder extending perpendicularly from the inner face of the other platen, the axes of said cylinder being substantially aligned, a ram sealably slidable within each cylinder, means for introducing pressure fluid into each cylinder so as to move the ram therein from a retracted to an extended position with respect to said cylinder, and means connecting the ram slidable in the first cylinder to the second cylinder and connecting the ram slidable in the second cylinder to the first cylinder, whereby the forces developed in said cylinders are transmitted to the platens through said rams and cylinders, said connecting means being disposed outwardly of the paths of movement of the rams and the outer ends of the rams, when retracted, being spaced from one another to permit them to move toward one another, upon extension to move the platens apart with the combined forces of both cylinders.

16. Apparatus of the character defined in claim 15, wherein the outer ends of the retracted rams are spaced apart a distance not substantially greater than the strokes of the rams from retracted to extend positions.

17. Apparatus of the character defined in claim 15, wherein the rams are of the same diameter.

18. An actuator, comprising a first cylinder having a first ram sealably slidable therein, a second cylinder having a second ram sealably slidable therein and axially aligned with the first cylinder, means for introducing pressure fluid into each cylinder to move the ram therein from retracted to extended positions with respect to said cylinder, the open ends of the cylinders facing one another and the outer ends of the rams being spaced apart, when retracted, to permit them to move toward one another, when extended, means disposed outwardly of the path of movement of the second ram for connecting the first ram to the second cylinder, and means disposed outwardly of the path of movement of the first ram for connecting the second ram to the first cylinder, whereby the first and second cylinders may be moved apart by the combined forces of both.

19. An actuator of the character defined in claim 18, wherein the first and second rams are of the same diameter.

20. An actuator of the character defined in claim 18, wherein the outer ends of the retracted rams are spaced apart a distance not substantially greater than their stroke from retracted to extended positions.

References Cited

UNITED STATES PATENTS

| 2,197,441 | 4/1940 | Perony | 72—453 |
| 3,274,819 | 9/1966 | Knowles | 72—453 |
| 3,333,457 | 8/1967 | Allen | 72—453 |

CHARLES W. LANHAM, Primary Examiner

G. P. CROSBY, Assistant Examiner

U.S. Cl. X.R.

100—269